United States Patent
Schuetzenberger et al.

(10) Patent No.: US 12,214,453 B2
(45) Date of Patent: Feb. 4, 2025

(54) METHOD AND CARRIER GAS NOZZLE FOR SUPPLYING A FLUID TO A WELDING AREA OF A WORKPIECE

(71) Applicant: FRONIUS INTERNATIONAL GMBH, Pettenbach (AT)

(72) Inventors: Andreas Schuetzenberger, Pettenbach (AT); Andreas Leonhartsberger, Pettenbach (AT); Patrick Hauser, Pettenbach (AT); Manuel Mayer, Pettenbach (AT); Rick Grunwald, Pettenbach (AT); Wolfgang Haberler, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 61 days.

(21) Appl. No.: 18/563,505

(22) PCT Filed: May 24, 2022

(86) PCT No.: PCT/EP2022/063952
§ 371 (c)(1),
(2) Date: Nov. 22, 2023

(87) PCT Pub. No.: WO2022/248423
PCT Pub. Date: Dec. 1, 2022

(65) Prior Publication Data
US 2024/0217019 A1    Jul. 4, 2024

(30) Foreign Application Priority Data

May 25, 2021  (EP) .................................... 21175756

(51) Int. Cl.
*B23K 9/16*    (2006.01)
*B23K 9/04*    (2006.01)
(Continued)

(52) U.S. Cl.
CPC .................. *B23K 9/16* (2013.01); *B23K 9/04* (2013.01); *B23K 9/29* (2013.01); *B23K 9/325* (2013.01)

(58) Field of Classification Search
CPC .............. B23K 10/027; B23K 2103/14; B23K 26/0006; B23K 26/1438; B23K 26/1464;
(Continued)

(56) References Cited

U.S. PATENT DOCUMENTS

| 3,172,992 A * | 3/1965 | Keller ..................... B23K 9/285 |
|---|---|---|
| | | 219/137.61 |
| 2012/0061364 A1* | 3/2012 | Purslow ................. B23K 9/328 |
| | | 219/137.31 |
| 2019/0001437 A1 | 1/2019 | Mathisen et al. |

FOREIGN PATENT DOCUMENTS

| CN | 106112230 A | 11/2016 |
|---|---|---|
| DE | 35 10 382 A1 | 7/1986 |

(Continued)

OTHER PUBLICATIONS

International Search Report in PCT/EP2022/063952, mailed Aug. 30, 2022.
(Continued)

*Primary Examiner* — Joe E Mills, Jr.
(74) *Attorney, Agent, or Firm* — Collard & Roe, P.C.

(57) ABSTRACT

In a method and a carrier gas nozzle for allowing at least one fluid to flow over a welding area of a workpiece along a welding path during a welding process, the at least one fluid is flowed onto the welding area via at least one inlet and channels having openings. The openings of the channels are divided into at least two sectors, and at least one flow parameter, if need be also a property of the at least one fluid of each sector, is individually controlled, wherein at least one flow parameter of at least one fluid of at least one sector (Continued)

is controlled depending on the geometry of the welding path and/or depending on the geometry of the workpiece.

13 Claims, 9 Drawing Sheets

(51) Int. Cl.
*B23K 9/29* (2006.01)
*B23K 9/32* (2006.01)

(58) Field of Classification Search
CPC .. B23K 26/147; B23K 26/342; B23K 26/348; B23K 26/60; B23K 37/06; B23K 9/16; B23K 9/04; B23K 9/29; B23K 9/325; B22F 2203/11
See application file for complete search history.

(56) References Cited

FOREIGN PATENT DOCUMENTS

| | | |
|---|---|---|
| EP | 3 741 492 A1 | 11/2020 |
| JP | H08-71779 A | 3/1996 |
| WO | 2020/234329 A1 | 11/2020 |

OTHER PUBLICATIONS

European Search Report dated Dec. 9, 2021 in European Application No. 21175756.2, with English translation of the relevant parts.

\* cited by examiner

METHOD AND CARRIER GAS NOZZLE FOR SUPPLYING A FLUID TO A WELDING AREA OF A WORKPIECE

CROSS REFERENCE TO RELATED APPLICATIONS

This application is the National Stage of PCT/EP2022/063952 filed on May 24, 2022, which claims priority under 35 U.S.C. § 119 of European Application No. 21175756.2 filed on May 25, 2021, the disclosure of which is incorporated by reference. The international application under PCT article 21(2) was not published in English.

The invention relates to a method for allowing at least one fluid to flow over a welding area of a workpiece along a welding path during a welding process, wherein the at least one fluid is flowed onto the welding area via at least one inlet and a plurality of channels having openings.

The invention further relates to a carrier gas nozzle for supplying a welding area of a workpiece along a welding path with at least one fluid during a welding process, having a housing, at least one inlet for the at least one fluid and a plurality of channels having openings, via which the at least one fluid flows onto the welding area, the channels with the openings being divided into at least two sectors, having at least one inlet for at least one fluid, which sectors are configured for individually controlling at least one flow parameter of the at least one fluid of each sector.

In most welding processes, a protective gas is used to increase the stability of the welding process, which is supplied via the gas nozzle to protect the arc. This protective gas is also referred to as the primary protective gas. In order to protect the trailing molten mass from air ingress and oxidation by oxygen, in particular during build-up welding and in the so-called arc-DED method (Arc-Direct Energy Deposition), carrier gas nozzles of the present type are partially used, via which additional protective gas flows over the welding area in order to prevent a reaction of the molten material with the oxygen in the surrounding air and to improve the welding quality. Protective gas used in such carrier gas nozzles is also referred to as secondary protective gas. Especially when machining workpieces made of alloyed steels, aluminium alloys or titanium, etc., the use of a secondary protective gas is necessary to achieve good welding results, since these materials react strongly with oxygen. For example, titanium oxidises at temperatures above 300° C. due to its high affinity for oxygen, which is why a protective atmosphere is required here. Argon, for example, is used for this purpose, which is also often used as a primary protective gas to protect the arc during the welding process. Of course, the term "during the welding process" also includes the phases before the welding process or before the ignition of the arc, the so-called pre-flow, during which flow can take place to prevent oxidation before the start of the welding process, the phases after the welding process, the so-called last runnings, during which the workpiece is cooled, and any pauses between individual welding phases.

In the case of smaller components made of the above-mentioned materials, the welding process can also be carried out in chambers in order to protect the weld seam or the welding area from air ingress and oxidation. However, welding in a chamber is very complex and also associated with a very high consumption of protective gas. In addition, the welding of larger workpieces, such as, for example, aircraft components, in chambers is not possible or involves a very great deal of effort.

Via carrier gas nozzles, the secondary protective gas is suitably applied to the trailing welding area until the workpiece or the welding area is cooled below the temperature at which a reaction of the respective material with oxygen takes place. For example, WO 2020/234329 A1 describes a carrier gas nozzle, which is formed by a plurality of gas channels arranged in parallel, each having a height that corresponds to at least six times the hydraulic diameter. As a result, an optimal flow and protective gas distribution can be achieved and a laminarisation of the protective gas flow within the gas channels can be achieved with at the same time relatively low consumption of protective gas. Thus, the welding area covered by the carrier gas nozzle is optimally protected against air ingress, resulting in a weld seam or a workpiece surface with optimal properties and the highest quality.

CN 106112230 A describes a welding device in which, separate from the welding torch, devices are provided for the special flow of protective gas to the welding point on both sides of the welding path. Since the protective gas devices are arranged separately from the welding torch, the effort in handling is increased. Measures to reduce the consumption of protective gas are not mentioned.

From US 2019/0001437 A1 a device for build-up welding for flowing protective gas to the welding point is known, the protective gas being flowed to the molten mass via a series of accordingly arranged nozzles in an elaborate manner. Apart from the complex design, no measures for reducing the consumption of protective gas are mentioned in this state of the art.

Finally, JP H0871779 A discloses a special design of a laser welding device for pipe welds with several nozzles for supplying one and the same protective gas to the welding point and surroundings.

In addition to a protective gas, the welding area can also be supplied with a liquid or a mixture of a gas and a liquid in order to protect the welding area from oxygen and, if necessary, to cool it. Therefore, in the following, the term fluid is used, which includes gases, liquids and mixtures of gases and liquids.

A disadvantage of previous methods and carrier gas nozzles for supplying a welding area of a workpiece with at least one fluid, in particular a protective gas, along a welding path is the high consumption of the fluids for protecting or cooling the welding area and the associated high costs. In particular, protective gases, such as argon, which are intended to prevent oxidation of the surface of the workpiece, are relatively expensive.

The object of the present invention is to provide an above-mentioned method and a carrier gas nozzle for applying at least one fluid to a welding area of a workpiece along a welding path, by means of which the consumption of fluid for protecting and cooling the welding area can be minimised and thus the costs can be kept low. Nevertheless, the welding area should be optimally protected against air ingress, so that the highest possible welding quality results. Disadvantages of known methods and carrier gas nozzles of the present type are to be prevented or at least reduced.

The object according to the invention is achieved by an above-mentioned method for applying flow to a welding area of a workpiece, wherein the openings of the channels are divided into at least two sectors, and at least one flow parameter of the at least one fluid of each sector is individually controlled, wherein at least one flow parameter of at least one fluid of at least one sector is controlled depending on the geometry of the welding path and/or depending on the geometry of the workpiece. Due to the fact that the flow of the fluid, in particular a protective gas or a cooling liquid, through the welding area of the workpiece is divided into sectors and the flow parameters of the fluid of each sector are controlled individually and depending on the geometry of the welding path and/or depending on the geometry of the workpiece, the at least one fluid can be used in a more targeted manner and thus the consumption of fluid can be significantly reduced. In contrast to conventional methods, in which the entire welding area of the workpiece covered by the carrier gas nozzle is flowed with the fluid, in the method according to the invention, the flow of the welding area of the workpiece can be controlled sector by sector and depending on the geometry of the welding path and/or depending on the geometry of the workpiece, and thus only the amount of fluid necessary to prevent oxidation or cooling of the workpiece surface can be used. If the welding path runs straight, the sector of the carrier gas nozzle covering the straight welding path during the manufacturing process is activated and the largest amount of fluid flows onto the surface of the workpiece in this sector. If the welding path runs in a curve or corner, other sectors are controlled. The data on the geometry of the welding path are known to the welding device and must be transmitted accordingly to the device for controlling the flow parameters of the at least one fluid before the welding process is carried out. For example, the data of the welding robot can be used for this purpose. Since the geometry of the workpiece to be produced also has a major influence on the temperature profile of the workpiece during the welding process, it is also advantageous to take this into account when controlling the flow parameter of the at least one fluid in each sector. A cooling fluid can also be used as the fluid, whereby a faster cooling and also falling below a certain temperature of the material of the workpiece can be achieved and thus the consumption of the required protective gas can be reduced. In particular, a cooling liquid, preferably water, can be used as the cooling fluid, wherein the type of cooling liquid can be adapted to the material of the workpiece. When the cooling liquid evaporates, the resulting gas can also form a protective function for the surface of the workpiece. In addition, a more rapid lowering of the workpiece temperature below the temperature at which a reaction with the atmospheric oxygen takes place can also be achieved. This results in a higher welding quality due to an optimal formation of the structure of the workpiece. Due to the targeted control of the flow parameters of the fluid, certain temperature-time cooling profiles can be set for a desired cooling and thus a certain structure. For example, a so-called Widmannstätten structure can be achieved as a which result, is required in aircraft construction. Flow parameters are understood to mean parameters that relate to the flow of the fluid, in particular the flow quantity, the flow volume or the flow rate of the protective gas, the cooling liquid or a mixture of gas and liquid. The control of the flow parameters of the at least one fluid of each sector can be carried out relatively easily by sector-by-sector control by means of valves or flow controllers in supply lines and can thus be made with relatively little effort.

If, in addition to the flow parameter of the at least one fluid, at least one property of the at least one fluid is also individually controlled, further advantages can be achieved. The term property of the fluid includes, for example, the type of fluid, the temperature of the fluid or the composition of the fluid, for example the composition of a mixture of several gases or the composition of a mixture of a gas and a liquid. If the properties of the at least one fluid of each sector are also individually controlled, the protection and cooling of the welding area of the workpiece can be adapted even more specifically to the respective manufacturing process and the consumption of fluid can be reduced or the welding quality can be further improved.

If at least one flow parameter and/or at least one property of the at least one fluid of each sector is individually controlled depending on at least one temperature of the welding area of the workpiece, the consumption of the fluid can be adapted even better to the actual conditions. In particular, if the material of the workpiece has fallen below a certain temperature, it is possible to dispense with the flow of the fluid or to change the type of fluid, as a result of which further costs can be saved. For example, the temperature of titanium is 300° C., above which temperature protection of the material with protective gases, such as, for example, argon, is required to prevent oxidation. Below this temperature, for example, another gas, such as, for example, compressed air, carbon dioxide, nitrogen or a liquid, for example water, can be used in order to cool the temperature of the welding area even further. Since compressed air, carbon dioxide, nitrogen and water are much cheaper than argon, the cost of consumables can be significantly reduced. In addition, a faster cooling of the component is possible, for example, by the use of water when the oxidation temperature is not reached. As a result, a shorter production time can also be achieved.

In this case, the at least one temperature of the welding area of the workpiece can be measured with at least one temperature sensor in order to be able to control the flow parameters and/or properties of the at least one fluid of each sector depending on the temperature. The term temperature sensor includes all possible contact or non-contact sensors, such as, for example, thermocouples, semiconductor elements (NTC thermistors, PTC thermistors), pyroelectric sensors, mechanical sensors (strain gauges), magnetic temperature sensors up to optical temperature sensors and thermal imaging cameras.

Alternatively or additionally to a physical measurement of the temperature, at least one temperature of the welding area of the workpiece can also be estimated by simulation or parameter calculation. With the help of suitable software applications, the temperature profile of a replica of the workpiece during production can be determined and estimated virtually or mathematically, and the control of the flow parameters and/or properties of the at least one fluid of each sector can be set and controlled depending on this simulated temperature. Parameters for the control can also be defined by corresponding measurement or scanning of finished workpieces, for example with optical methods.

Finally, the at least one temperature of the welding area of the workpiece can also be determined via the energy introduced into the workpiece during the welding process. In this indirect determination or estimation of the temperature of the workpiece, the energy introduced is detected via the welding current and the welding voltage and the approximate temperature is deduced therefrom. In particular, the geometry of the workpiece to be produced or machined as well as the quantity and material of the welding material used are also taken into account. Although this method is not as accurate as the physical measurement of temperature, it does not require its own sensors or simulation methods.

Advantageously, when the temperature falls below or exceeds a predetermined limit temperature, at least one flow parameter and/or at least one property of the at least one fluid of at least one sector is changed. Thus, limit values for the temperature can be defined below or above which certain flow parameters and certain properties apply to the fluids, which are then set depending on the temperature. For example, at the temperature of a material of a workpiece, the type of protective gas used can be changed as a fluid (below the so-called dissociation temperature of the inert gas used—e.g. argon—a more favourable non-inert gas—e.g. carbon dioxide $CO_2$—can be used). Likewise, the volume flow of the fluid used can be changed or controlled depending on the temperature profile on the workpiece or by defining at least one limit temperature.

Likewise, at least one flow parameter and/or at least one property of the at least one fluid of each sector can be individually controlled depending on a predetermined temperature-time cooling profile of the workpiece. As a result, the formation of the structure of the workpiece can be adjusted even better and its design, type and fineness can be influenced.

According to a further feature of the invention, it is provided that at least one property of at least one fluid of at least one sector is controlled depending on the geometry of the welding path and/or depending on the geometry of the workpiece. As a result, the consumption of fluid can be further adapted sector by sector to the course of the welding path and the geometry of the workpiece. If the welding path runs straight, the sector of the carrier gas nozzle covering the straight welding path during the manufacturing process is activated and the largest amount of fluid flows onto the surface of the workpiece in this sector. If the welding path runs in a curve or corner, other sectors are controlled. Since the geometry of the workpiece to be produced also has a major influence on the temperature profile of the workpiece during the welding process, it is advantageous to take the property of the at least one fluid of each sector into account when controlling it.

At least one flow parameter and/or at least one property of at least one fluid of at least one sector can also be controlled depending on the welding process. An arc welding process with low heat input, for example a CMT (cold metal transfer) process, can be set, so that, for example, air is sufficient as the fluid. Likewise, an arc welding method with a high heat input, for example a pulse welding process in which greater cooling is necessary, can be set.

The object according to the invention is also achieved by an above-mentioned carrier gas nozzle, in which the at least two sectors are arranged depending on the geometry of the welding path and/or the geometry of the workpiece, so that at least one flow parameter of at least one fluid of at least one sector can be controlled depending on the geometry of the welding path and/or depending on the geometry of the workpiece. The channels and openings of the carrier gas nozzle are thus divided into several sectors, as a result of which an individual control of the flow parameters of the at least one fluid of each sector is made possible depending on the geometry of the welding path and/or depending on the geometry of the workpiece. The individual control can be formed by individual inlets for at least one fluid for each sector or also individual valves in inlet lines or intermediate lines, which feed the channels of the sectors with the fluid. In particular, if the carrier gas nozzle is produced by a 3D printing process, this division of the channels into several sectors and the necessary channels and inlets can be produced relatively easily and inexpensively. With regard to the further advantages, reference is made to the above description of the method.

The sectors can be constructed in the form of modules that can be connected to one another. Such a modular design of the carrier gas nozzle achieves greater flexibility. In this way, carrier gas nozzles suitable for certain manufacturing processes can be constructed by accordingly connecting the modules, and a desired number and arrangement of sectors can be formed. The modules can, for example, be screwed together or connected to one another without tools via latching connections. Non-releasable welded, soldered or glued connections are also conceivable.

Depending on the application, the sectors can be arranged symmetrically, for example circularly symmetrically, or also asymmetrically. The number and arrangement of the sectors of the carrier gas nozzle will be adapted accordingly to the geometry and course of the welding path, the geometry of the workpiece as well as the materials of the workpiece used. In the case of particularly oxidation-sensitive materials, the carrier gas nozzle will also have to be made larger, since the workpiece must be protected from air supply and cooled for a longer period of time before the material has solidified and there is no longer any risk of loss of quality.

If at least one temperature sensor for measuring at least one temperature of the welding area of the workpiece is provided at the carrier gas nozzle, the control of the flow parameters and properties of the at least one fluid can be further improved.

The at least one temperature sensor can be suitably arranged between the openings of the channels. The at least one temperature sensor is connected to the control device, for example the regulating device of the welding current source, via corresponding lines. A wireless connection is also conceivable, wherein corresponding transmitting devices can be arranged on the carrier gas nozzle, which transmits the signals of the temperature sensors to the respective devices.

If at least one cooling fluid line with at least one mouth for applying a cooling fluid to the welding area of the workpiece is provided, in addition to the fluid with which the workpiece is flowed, a more rapid cooling and also falling below the critical temperature of the material of the workpiece can be achieved, and thus the consumption of the more expensive protective gases necessary above critical temperatures can be further reduced. In particular, a cooling liquid, preferably water, is used as the cooling fluid.

When using a cooling liquid, it is advantageous if a nozzle, in particular an atomiser nozzle, flat nozzle, cone nozzle or the like, is arranged at the at least one mouth. This allows the cooling liquid to be applied in a particularly suitable manner to the hot surface of the workpiece and to cool it.

If a preferably pivotable device is provided for fastening the carrier gas nozzle to a welding torch, an easy connection of the carrier gas nozzle to the welding torch can be established. Due to the pivotability, the carrier gas nozzle can easily be pivoted away when not in use or a quick adjustment of the position of the carrier gas nozzle with respect to the welding area or the workpiece can be made. For the rapid attachment of the carrier gas nozzle with respect to the welding torch, corresponding fixing elements can be provided, which in particular allow manual attachment and release without tools.

Preferably, the housing, the at least one inlet for each fluid, the channels with the openings, and at most the at least one cooling fluid line are produced in one piece and preferably in a 3D printing process. As a result, the carrier gas nozzle can be manufactured quickly and cost-effectively.

The housing, the at least one inlet for each fluid, the gas channels with the openings, and at most the at least one cooling fluid line are made of an aluminium alloy, for example. Copper or a copper alloy is also suitable for producing the carrier gas nozzle.

The channels of the carrier gas nozzle preferably have a round or regularly polygonal cross section, preferably a square or hexagonal cross section. Such a design results in a regular wall thickness between the gas channels, which leads to uniform heat dissipation and offers advantages in terms of production.

The housing may have a substantially rectangular base area and the sectors may also have a rectangular base area. Any device for fastening the welding torch is preferably arranged on a broad side of the rectangular housing. This variant offers advantages in particular in the case of substantially straight welding paths.

Alternatively, the housing may also have a substantially round base area and the sectors may have a substantially circular sector-shaped base area. In this case, the possible device for fastening the welding torch is advantageously arranged substantially in the middle of the housing. This embodiment variant is particularly advantageous in the case of arc direct energy deposition (Arc-Direct Energy Deposition), since here a more extensive welding area is protected from the ingress of air.

The openings of all channels of the carrier gas nozzle can be arranged in one plane, which is particularly suitable for use in substantially flat welding areas and workpieces.

If the openings of all channels of the carrier gas nozzle are arranged on a curved surface, optimum protection of the welding area can also be achieved with non-planar workpieces, for example pipes, shaped pipes, vessels, etc. The curvature of the carrier gas nozzle is adapted accordingly to the curvature of the welding area or workpiece.

The present invention is further explained with reference to the appended drawings. In the drawings.

Figure 1:
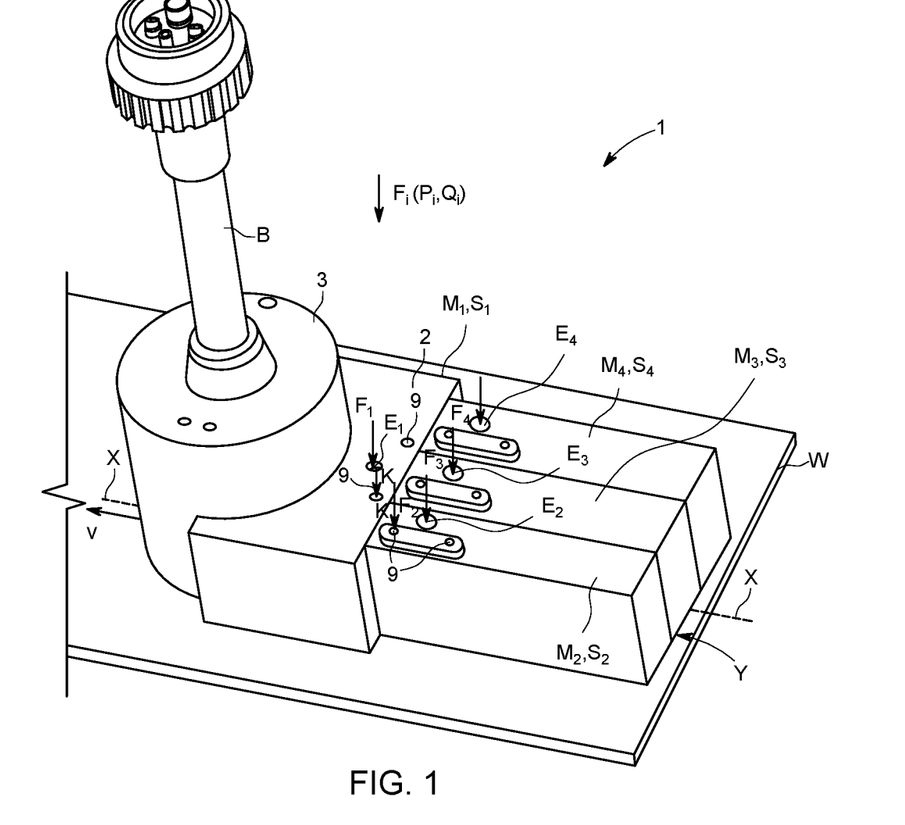
FIG. 1 is a perspective view of an embodiment of a substantially rectangular carrier gas nozzle.

FIG. 1 shows a perspective view of a preferred embodiment of a substantially rectangular carrier gas nozzle 1 for flowing at least one fluid $F_i$, in particular a protective gas or a cooling liquid or mixtures of a gas and a liquid, along a welding path X through a welding area Y of a workpiece W. The carrier gas nozzle 1 comprises a housing 2 and, at most, a device for fastening to a welding torch B. In order to carry out a rapid adjustment of the carrier gas nozzle 1 with respect to the welding torch B, the device can also be designed to be pivotable in order to be able to bring the carrier gas nozzle 1 out of the position of use (not shown). As a result, the process stability can be assessed, for example, in a welding start phase for quality control. During the welding process, the trailing welding area Y is covered by the carrier gas nozzle 1, as a result of which the welding area Y is protected from air ingress and cooled in order to be able to achieve an optimal quality of the weld seam or the welding surface. The length of the carrier gas nozzle 1 is selected in such a way that, at the desired welding speed v, it is ensured that the at least one fluid $F_i$ flows through the welding area Y until the critical temperature $T_k$ of the workpiece W in the welding area Y, at which a reaction with atmospheric oxygen takes place, is undershot. The depicted carrier gas nozzle 1 has a jacket 3 around the gas nozzle 4 of the welding torch B, via which the primary protective gas is supplied to protect the arc during the welding process (see also FIG. 2). Arranged on the jacket 3 is a module $M_1$ for forming a first sector $S_1$, which in turn is connected to three further modules $M_2$, $M_3$, $M_4$ for forming sectors $S_1$, $S_3$ and $S_4$. The connection between the modules $M_j$ can be embodied, for example, by a releasable connection, that is, by a screw connection, latching, or also by a non-releasable connection, such as welding, soldering, gluing, or the like. The carrier gas nozzle 1 can be expanded in a modular manner in order to achieve a shape of the carrier gas nozzle 1 calculated, for example, by simulation or parameter calculation (see also FIGS. 10 to 12). Instead of the interconnected modules $M_1$ to $M_4$, the housing 2 of the carrier gas nozzle 1 can also be produced in one piece, and sectors $S_1$ to $S_4$ can also be integrated in this common housing 2. The carrier gas nozzle 1 has at least one inlet $E_i$ for the at least one fluid $F_i$, here in each case one inlet $E_1$ to $E_4$ in each module $M_1$ to $M_4$ for in each case one fluid $F_1$ to $F_4$. Via a plurality of preferably parallel channels 6 having openings 7, the at least one fluid $F_i$ with corresponding flow parameters $P_i$ and properties $Q_i$ flows onto the welding area Y (see FIG. 3). Instead of a substantially rectangular shape of the carrier gas nozzle 1 in top view, round or other shapes are also possible. In the modules $M_1$ to $M_4$, the carrier gas nozzle 1 can also contain cooling fluid lines 9, via which, in addition to the at least one fluid $F_i$, a cooling fluid K can also be applied to the welding area Y.

As already mentioned, the carrier gas nozzle 1 can be embodied in one piece and can preferably be produced in a 3D printing process. For example, a laser sintering process is suitable for this, in which the material, in particular an aluminium alloy, is in powder form and is melted by a laser. In this way, the carrier gas nozzle 1 according to the invention can be produced particularly cost-effectively, and the geometry of the individual elements can be easily adapted as a result. All elements of the carrier gas nozzle 1, such as the housing 2, the at least one inlet $E_i$ for the at least one fluid $F_i$, the channels 6, and possibly a cooling fluid channel 9, are produced in one operation.

Figure 2:
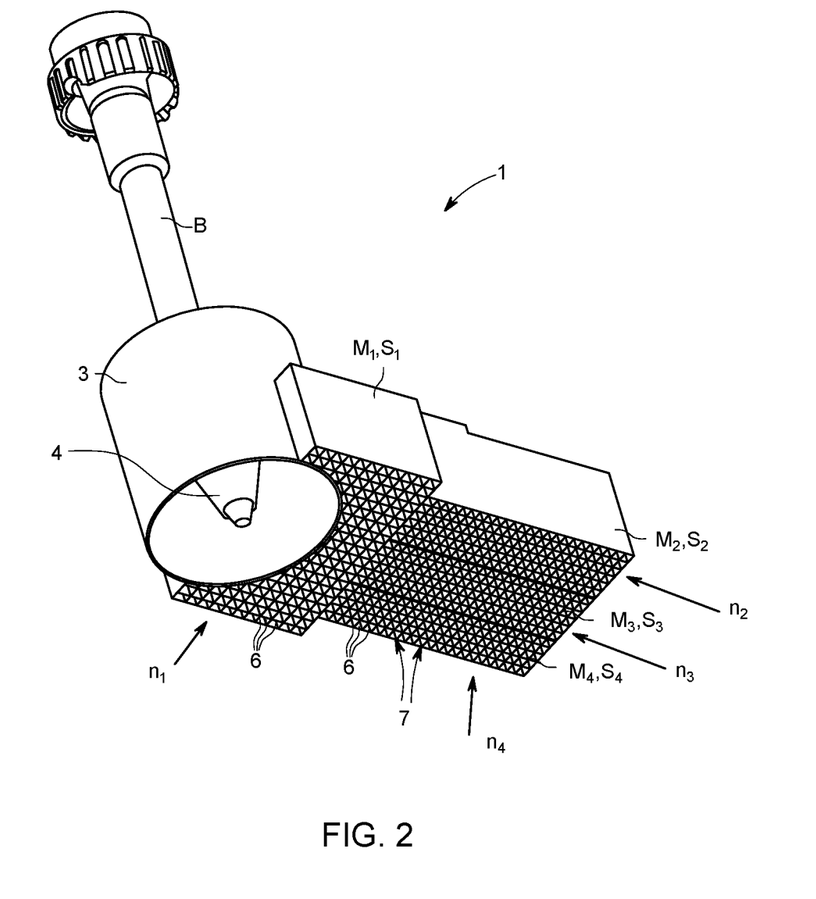
FIG. 2 is a perspective view of the carrier gas nozzle according to FIG. 1 from below.

FIG. 2 shows a perspective view of the carrier gas nozzle 1 according to FIG. 1 from below. In this case, the channels 6 with the openings 7 in sectors $S_1$ to $S_4$ can be seen, which here have a square cross section. The ratio of the height of the channel 6 to the hydraulic diameter is preferably selected so that the flow within the channels 6 is accordingly stilled and a uniform, laminar flow of the fluid $F_i$ results at the openings 7 of the channels 6. The size of the carrier gas nozzle 1 and also the number $n_i$ of channels 6 in each sector $S_i$ are selected according to the respective application.

In the illustrated exemplary embodiment of the carrier gas nozzle 1 according to FIGS. 1 and 2, the openings 7 of all channels 6 are arranged in one plane, which is particularly suitable for use on a substantially planar workpiece W. Alternatively, the openings 7 of the channels 6 may also be arranged on a curved surface. As a result, the shape of the carrier gas nozzle 1 can be adapted to the shape of the workpiece W. For example, when welding a pipe, the carrier gas nozzle 1 may be concavely or convexly curved in order to be able to achieve an adaptation to the outer or inner surface of the pipe (not shown). As a result, the welding area Y is optimally protected by the fluid $F_i$, and an optimal welding quality is achieved even with oxidation-sensitive materials, such as titanium in particular.

Figure 3:
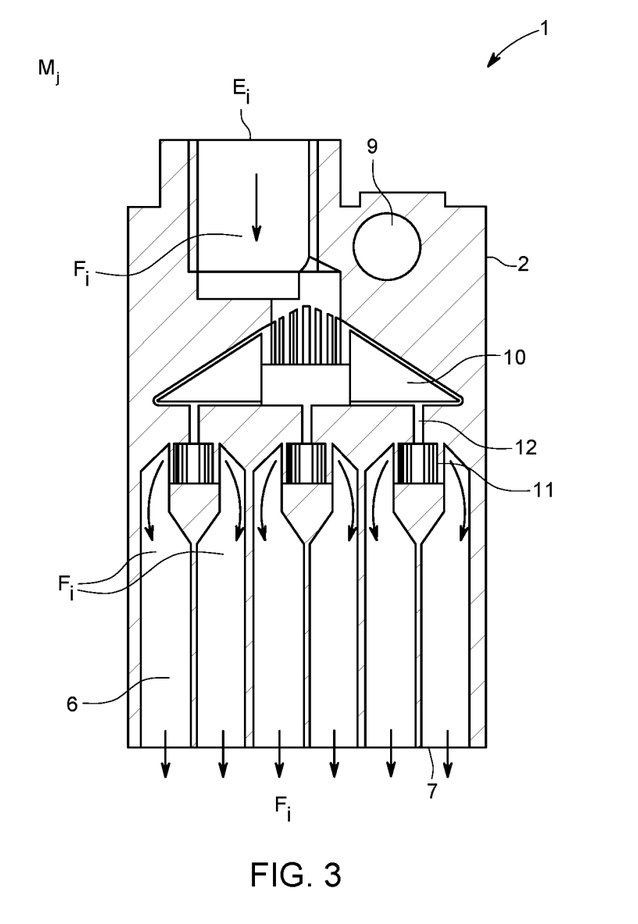
FIG. 3 is a section through a module of a carrier gas nozzle.

FIG. 3 shows a section through a module $M_j$ of a carrier gas nozzle 1. This shows the connection of the inlet $E_i$ for the fluid $F_i$ into a distribution chamber 15. In order to be able to optimally distribute the fluid $F_i$ flowing in from the inlet $E_i$ in the gas distribution chamber 10, an element 11 for distributing the fluid $F_i$ can additionally be arranged in the gas distribution chamber 10. Holes 12 lead from the distribution chamber 15 into the parallel channels 6. The distribution of the fluid $F_i$ can also take place in several stages, in that the fluid $F_i$ passes via the inlet $E_i$ into a first distribution chamber 10 and is passed via corresponding holes 12 into a second distribution chamber or several second gas distribution chambers, before the fluid $F_i$ is distributed via corresponding holes to all channels 6 (not shown). Such cascading results in an optimal and uniform distribution of the fluid $F_i$ to all channels 6 and thus a uniform flow through the openings 7 to the welding area Y of the workpiece W to be protected and cooled.

Figure 4:
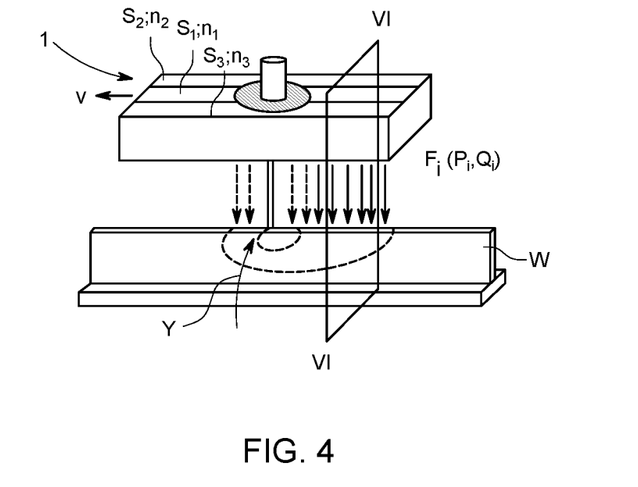
FIG. 4 is a schematic perspective view of a rectangular carrier gas nozzle with three rectangular sectors.

FIG. 4 shows a schematic perspective view of a rectangular carrier gas nozzle 1 and the underlying workpiece W, the welding area Y of which is flowed with at least one fluid $F_i$. In the illustrated carrier gas nozzle 1, the openings 7 of the channels 6 for the fluid $F_i$ are divided into three rectangular sectors $S_1$, $S_2$ and $S_3$. The number $n_i$ of channels 6 per sector $S_1$ can be the same or different. According to the invention, at least one flow parameter $P_i$ of the at least one fluid $F_i$ of each sector $S_1$, $S_2$ and $S_3$ can be controlled individually. The welding process proceeds in the direction of the longitudinal extension of the workpiece W, which is indicated by the arrow of the welding speed v.

Figure 5:
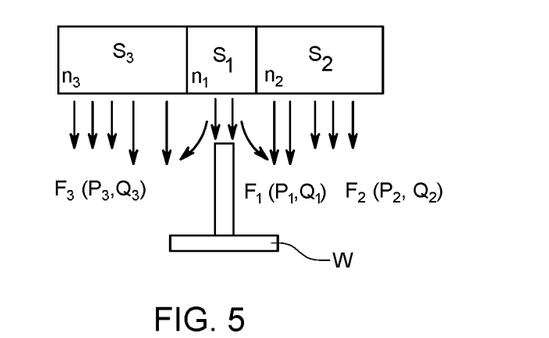
FIG. 5 is a sectional view through the carrier gas nozzle according to FIG. 4 along the sectional plane VI.
Figure 6:
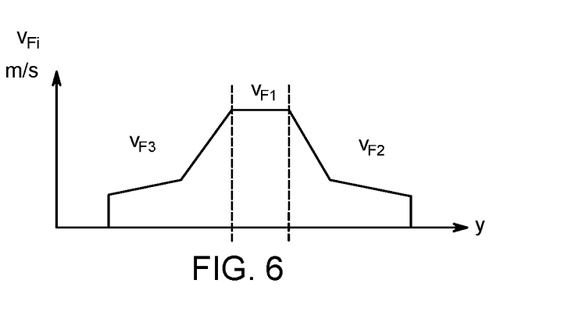
FIG. 6 is the flow profile of the fluid of the carrier gas nozzle according to FIG. 5.

FIG. 5 shows a sectional view through the carrier gas nozzle 1 according to FIG. 4 with the three sectors $S_1$, $S_2$ and $S_3$ along the sectional plane VI-VI, and underneath in FIG. 6 the flow profile of the fluid $F_i$ of the carrier gas nozzle 1 according to FIG. 5. The flow profile shows a flow parameter $P_i$ of the fluid $F_i$, here the flow rate $v_{Fi}$ of the fluid $F_i$ in the transverse direction along the y-axis. In accordance with the configuration of the carrier gas nozzle 1 according to the invention, the flow parameter $P_i$, here the flow rate $v_{Fi}$ of the fluid $F_1$, $F_2$, $F_3$ used in each sector $S_1$, $S_2$ and $S_3$, is controlled individually. Sectors $S_1$, $S_2$, and $S_3$ can, of course, be individually configured in different ways. For example, sector $S_1$ may be configured with a diffuser as in FIG. 3, since a particularly laminar flow is desired here in order to prevent oxidation on the workpiece W. Sectors $S_2$ and $S_3$, for example, are only used for cooling and therefore do not need a diffuser, since the temperature there is cooled to such an extent that oxidation no longer takes place. Thus, sectors $S_2$, $S_3$ can be produced in a geometrically simpler and thus more cost-effective manner. Here, the flow rate $v_{F1}$ of the fluid $F_1$ in first sector $S_1$ is selected to be higher than the flow rates $v_{F2}$, $v_{F3}$ of the fluids $F_2$, $F_3$ of sectors $S_2$ and $S_3$, which are further away from the welding area Y to be protected and cooled along the welding path X than sector $S_1$. The flow parameters $P_i$ of the fluids $F_i$ can be controlled by separate inlets $E_1$, $E_2$, $E_3$ for the fluids $F_i$, $F_2$ and $F_3$ of each sector $S_1$, $S_2$ and $S_3$. In this case, the type of fluid $F_i$ of each sector $S_1$ could also be changed individually and, for example, a different fluid $F_i$ could be used for sector $S_1$ than for sectors $S_2$ and $S_3$ or a different composition of the fluids $F_2$ and $F_3$. Likewise, the carrier gas nozzle 1 may be designed so that it has only one inlet E for a fluid F and the inlet is divided between sectors $S_1$, $S_2$ and $S_3$. If each sector $S_1$, $S_2$ and $S_3$ now has its own valve or its own flow controller (not shown) for the fluid F, the flow parameter $P_i$ of the fluid F in each sector $S_1$, $S_2$ and $S_3$ can be controlled individually. The method according to the invention for applying a fluid $F_i$ to a welding area Y of a workpiece W and the design of the carrier gas nozzle 1 according to the invention enable individual control of the fluids $F_i$ used, whereby the consumption of the fluids $F_i$ used and thus the costs can be minimised with optimal quality of the resulting welding result.

Figure 7:
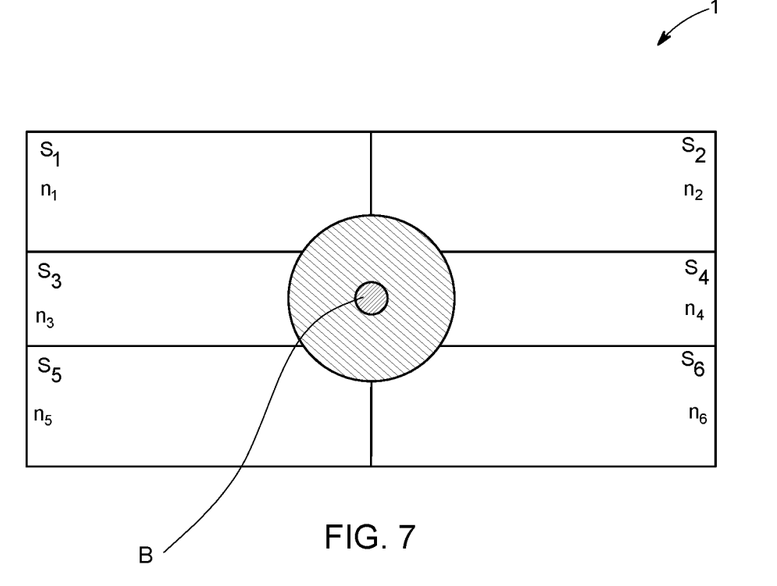
FIG. 7 is a top view of a rectangular carrier gas nozzle with six symmetrically arranged rectangular sectors.

FIG. 7 shows a top view of a rectangular carrier gas nozzle 1 with six symmetrically arranged rectangular sectors $S_1$ to $S_6$. The inlet E for the fluid F or several inlets E for the fluids $F_i$ are not shown. The welding torch B is arranged in the centre of the symmetrically constructed carrier gas nozzle 1. Assuming regularly arranged channels 6 in the carrier gas nozzle 1 shown here, the number $n_3$ and $n_4$ of channels 6 of sectors $S_3$ and $S_4$ is less than the number $n_1$, $n_2$, $n_3$ and $n_2$ of channels 6 of sectors $S_1$, $S_2$, $S_5$ and $S_6$. The respective design of the carrier gas nozzle 1 and division of the sectors $S_1$ is optimally adapted to the workpiece W to be produced. There are hardly any limits to the design options.

Figure 8:
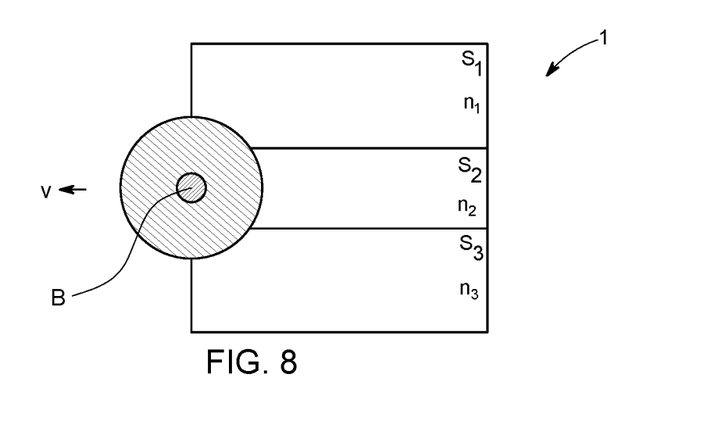
FIG. 8 is a top view of a rectangular carrier gas nozzle with three asymmetrically arranged rectangular sectors.

FIG. 8 shows the top view of a rectangular carrier gas nozzle 1 with three asymmetrically arranged rectangular sectors $S_1$, $S_2$ and $S_3$. Such a configuration will be expedient if the carrier gas nozzle 1 or the welding torch B is generally moved over the workpiece W in a preferred welding direction (see arrow of the welding speed v), since the welding area Y covered by the carrier gas nozzle 1 after welding must always be flowed with the fluid $F_i$ and protected and cooled.

Figure 9:
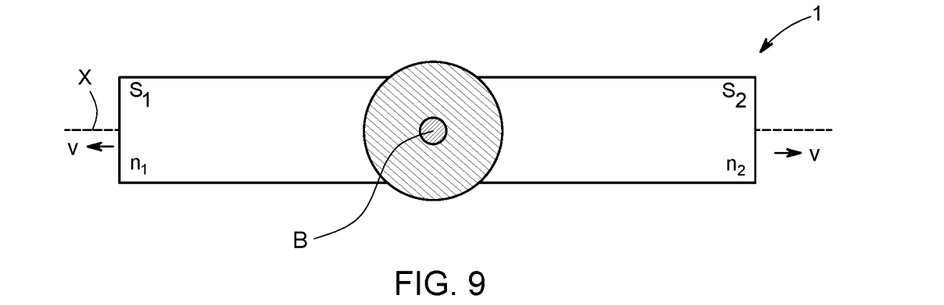
FIG. 9 is a top view of a rectangular carrier gas nozzle with two symmetrically arranged rectangular sectors.

FIG. 9 shows a top view of a rectangular carrier gas nozzle 1 with two symmetrically arranged rectangular sectors $S_1$ and $S_2$, each with a corresponding number $n_1$ and $n_2$ of channels 6. This embodiment variant of the carrier gas nozzle 1 will be expedient in particular for straight welding paths X, which are swept in both directions.

Figure 10:
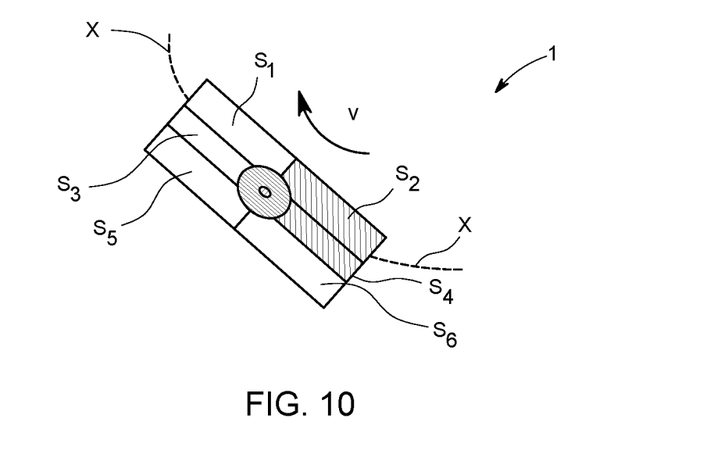
FIG. 10 is a schematic view of a carrier gas nozzle with six sectors according to FIG. 7, wherein the flow parameters of the fluid of each sector are controlled depending on the geometry of the curved welding path.

FIG. 10 shows, on the basis of a schematic view of a carrier gas nozzle 1 with six sectors $S_1$ to $S_2$ according to FIG. 7, the control of the flow parameters $P_i$ of the fluid $F_i$ of the sectors $S_i$ depending on the geometry of a curved welding path X. When the carrier gas nozzle 1 moves during the welding process along the welding path X in the direction of the arrow of the welding speed v, expediently only sectors $S_2$ and $S_4$ are actuated, that is to say only the flow of the fluids $F_2$ and $F_4$ in sectors $S_2$ and $S_4$ is activated, since the freshly welded area is only covered by these two sectors $S_2$ and $S_4$ due to the curved shape of the welding path X. As a result, a large amount of fluid $F_i$, which would otherwise also flow via the other sectors $S_1$, $S_3$, $S_5$ and $S_6$ to the welding area Y, can be saved.

Figure 11:
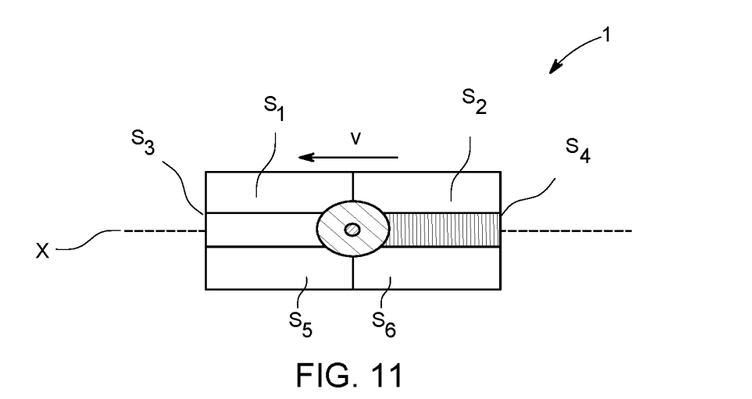
FIG. 11 is a schematic view of a carrier gas nozzle with six sectors according to FIG. 7, wherein the flow parameters of the fluid of each sector are controlled depending on the geometry of the straight welding path.

FIG. 11 shows a schematic view of a carrier gas nozzle 1 with six sectors $S_1$ to $S_2$ according to FIG. 7. When the carrier gas nozzle 1 moves during the welding process along the substantially straight welding path X in the direction of the arrow of the welding speed v, only sector $S_4$ is expediently actuated, that is to say only the flow of the fluid $F_4$ in sector $S_4$ is activated, since the freshly welded area is only covered by this sector $S_4$ due to the straight welding path X.

Figure 12:
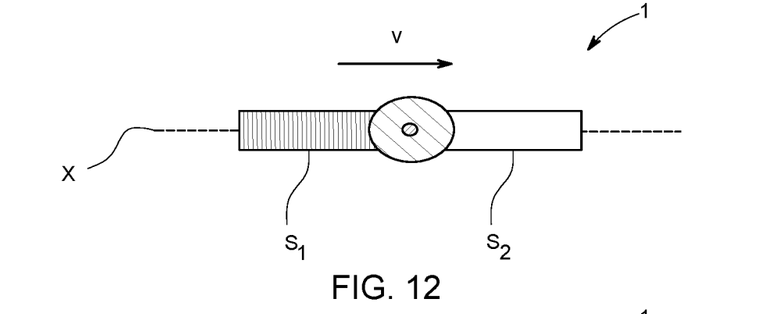
FIG. 12 is a schematic view of a carrier gas nozzle with two sectors according to FIG. 9, wherein the flow parameters of the fluid of the sectors are controlled depending on the geometry of the welding path.

FIG. 12 shows a schematic view of a carrier gas nozzle 1 with two sectors $S_1$, $S_2$ according to FIG. 9 during welding along a straight welding path X. When the carrier gas nozzle 1 moves during the welding process in the direction of the arrow of the welding speed v, only the sector $S_1$ is expediently actuated, that is to say only the flow of the fluid $F_1$ in sector $S_1$ is activated, since the freshly welded area is only covered by this sector $S_1$ due to the straight welding path X and the welding direction.

Figure 13:
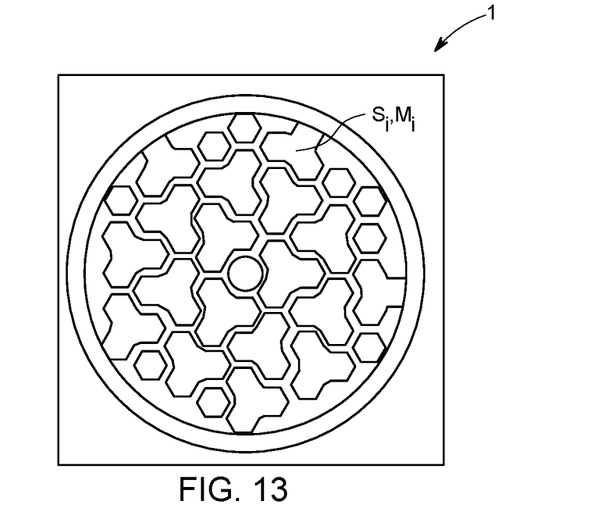
FIG. 13 is a top view of a round carrier gas nozzle having a plurality of sectors modularly constructed and interconnected.

FIG. 13 shows a top view of a round carrier gas nozzle 1 having a plurality of sectors $S_1$ which are constructed in a modular manner and are connected to one another. The individual modules $M_j$ may have different shapes, such as a substantially triangular outline in this case. This enables an individual composition of the carrier gas nozzle 1 from different modules $M_j$ to form the desired sectors $S_i$.

Figure 14:
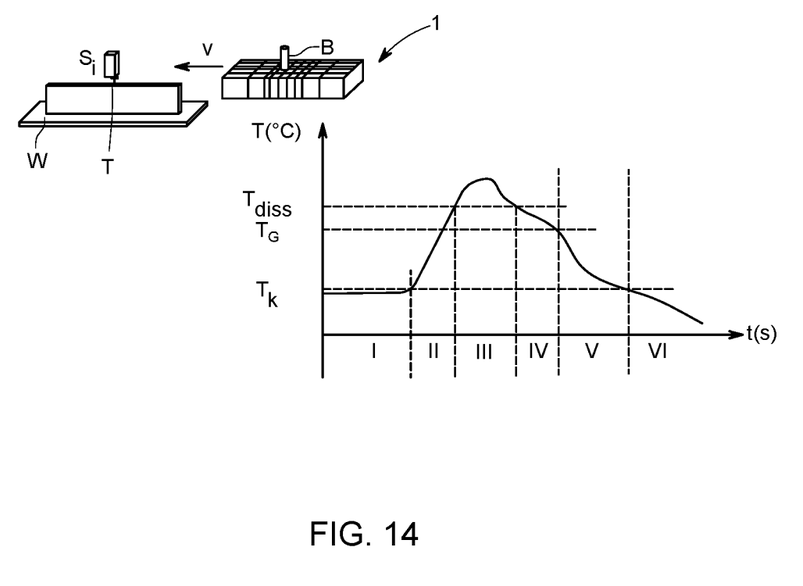
FIG. 14 is an illustrative temperature-time cooling curve for a workpiece during a welding process and appropriate control of the fluid parameters or properties of the fluid of the carrier gas nozzle.

FIG. 14 shows an exemplary temperature-time cooling curve in which the temperature T (in ° C.) at a stationary location on the workpiece W during the welding process during which the welding torch B is moved with the carrier gas nozzle 1 at the welding speed v over the workpiece W is shown depending on the time t (in s). At the beginning of the welding process during phase I, the temperature T is arranged below the critical temperature $T_k$ relevant for an oxidation. In this phase I, the welding area is cooled, for example, only with compressed air. Thus, during phase I, compressed air is used as fluid $F_i$ in the corresponding sector $S_i$ of the carrier gas nozzle 1, which is located just above the point at which the temperature T is measured. During phase II, the temperature T rises above the critical temperature $T_k$, which is why carbon dioxide $CO_2$, for example, is used as the fluid for the sector $S_i$, which is located above the point where the temperature T is measured. If the temperature T rises above the so-called dissociation temperature $T_{diss}$, an inert gas, e.g. argon, is added during phase III in order to protect the molten mass from oxidation during the welding process. After the temperature has fallen below the dissociation temperature $T_{diss}$ during phase IV, the cheaper carbon dioxide $CO_2$, for example, can be used again instead of argon. If the temperature falls below a certain limit temperature $T_G$, a liquid, for example water, is additionally used to cool the workpiece more quickly (phase V). If the measured temperature T finally falls below the critical temperature $T_k$, the workpiece W can again be flowed exclusively with compressed air (phase VI). FIG. 14 shows only the control of the type of fluid $F_i$ of the sectors $S_i$ of the carrier gas nozzle 1 depending on the temperature T measured at one point. When several temperature sensors are arranged, the properties $Q_i$ or flow parameters $P_i$ of the fluids $F_i$ for the sectors $S_i$, which are located just above the point of the respective temperature sensor, can be adapted to the respective measured temperature T or the temperature profiles can be adjusted and changed by changing the properties $Q_i$ or flow parameters $P_i$ of the fluids $F_i$ for the sectors $S_i$. Thus, the temperature-time cooling profile can also be adapted to the geometry of the workpiece W. For example, the workpiece W may have less material at the edge, so that the heat input during the welding process is lower and thus the cooling after the welding process must also be lower, while a higher cooling capacity will be required in the centre of the workpiece W.

Figure 15A:
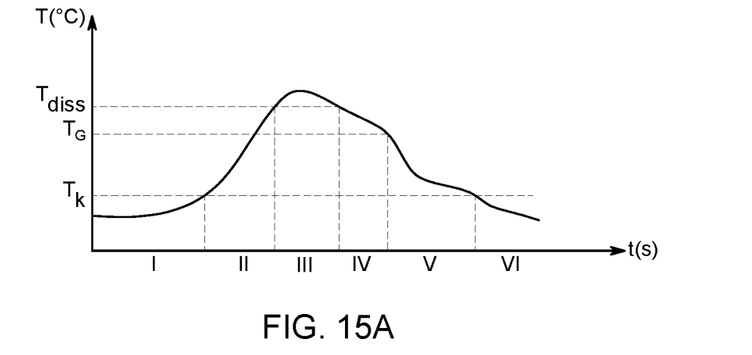
FIGS. 15A to 15C are further illustrative temperature-time cooling curves for a workpiece during a welding process with three different courses of cooling.
Figure 15B:
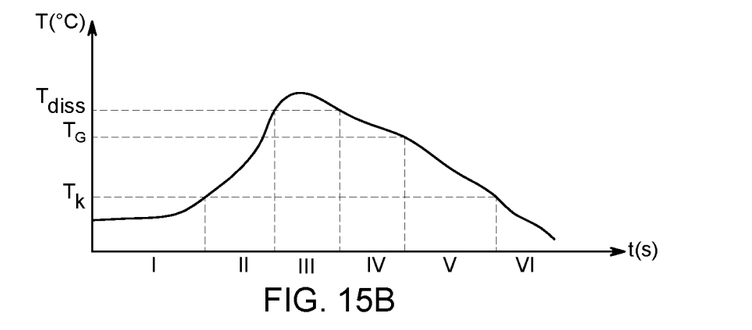
Figure 15C:
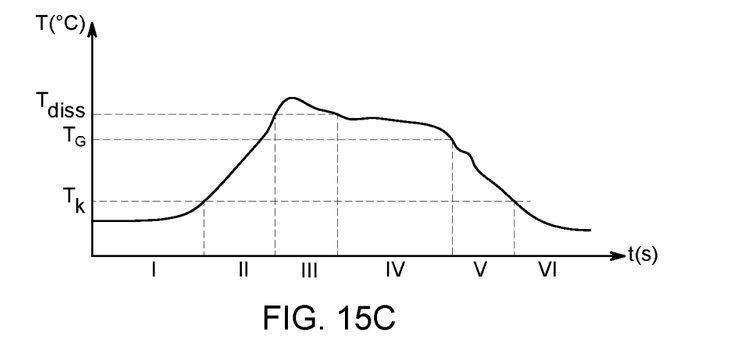

Finally, FIGS. 15A to 15C show further exemplary temperature-time cooling curves for a workpiece W during a welding process with three different cooling curves from phase IV onwards after falling below the dissociation temperature $T_{diss}$.

According to FIG. 15A, after cooling the temperature T below the dissociation temperature $T_{diss}$ in phase IV, very rapid cooling is achieved, for example, by a maximum volume flow of the fluid $F_i$, for example carbon dioxide $CO_2$, used in the respective sector $S_i$ of the carrier gas nozzle 1. The cooling rate is, for example, between 50° C./s and 1000° C./s, preferably between 100° C./s and 500° C./s, depending on the geometry of the workpiece W and the material accumulation during the production process. During phase V, after falling below a limit temperature $T_G$, a very rapid cooling takes place at the beginning through the use of an additional, external cooling medium in the relevant sector $S_i$. Over time t, the cooling capacity of the external cooling medium is reduced, which is why the slope of curve 1 becomes flatter during phase V. In phase VI, after the temperature T drops below the critical temperature $T_k$, the cooling is influenced, for example, by controlling the volume flow of an additional cooling gas, such as, for example, air.

In FIG. 15B, the cooling in phase IV is lower than the temperature profile according to FIG. 15A due to a lower volume flow of a protective gas in the respective sector $S_i$. Thus, the duration of phase IV is greater than in FIG. 15A. In phase V, for example, a substantially constant drop in temperature T takes place by the constant addition of an external cooling medium in the respective sector $S_i$. In phase VI, for example, cooling is again influenced by the control of the volumetric flow of air.

FIG. 15C shows a temperature-time profile in which, in phase IV, the cooling takes place in a slowed manner by reducing the volume flow of the protective gas in the respective sector $S_i$. As a result, the phase IV is substantially longer than in the courses according to FIGS. 15A and 15B. After falling below the dissociation temperature $T_{diss}$ in phase V, according to FIG. 15C, cooling takes place with increasing drop by increasing the cooling capacity by an external cooling medium in the respective sector $S_i$. After falling below the critical temperature $T_k$ in phase VI, the cooling is again influenced by controlling the volume flow of an additional cooling gas, for example air. FIGS. 15A to 15C show various possibilities of influencing the temperature-time cooling profile of the workpiece W by different flow parameters $P_i$ or properties $Q_i$ of the fluids $F_i$ used in the respective sector $S_i$ of the carrier gas nozzle 1.

The present invention allows the amount of fluids $F_i$ used to be minimised and the welding quality to be optimised.

The invention claimed is:

1. A method for allowing at least one fluid to flow over a welding area of a workpiece along a welding path during a welding process, the method comprising:
flowing the at least one fluid onto the welding area via at least one inlet and a plurality of channels having openings, wherein the openings of the channels are divided into at least two sectors, and individually controlling at least one flow parameter of the at least one fluid of each sector, wherein at least one flow parameter of at least one fluid of at least one sector is controlled depending on the geometry of the welding path and/or depending on the geometry of the workpiece.

2. The method according to claim 1, wherein at least one property of the at least one fluid is individually controlled.

3. The method according to claim 1, wherein at least one flow parameter and/or at least one property of the at least one fluid of each sector is individually controlled depending on at least one temperature of the welding area of the workpiece.

4. The method according to claim 3, wherein the at least one temperature of the welding area of the workpiece is measured with at least one temperature sensor, is estimated by simulation or parameter calculation, and/or is determined via the energy introduced into the workpiece during the welding process.

5. The method according to claim 3, wherein when the temperature falls below or exceeds a predetermined limit temperature, at least one flow parameter and/or at least one property of the at least one fluid of at least one sector is changed.

6. The method according to claim 3, wherein at least one flow parameter and/or at least one property of the at least one fluid of each sector is individually controlled depending on a predetermined temperature-time cooling profile of the workpiece.

7. The method according to claim 2, wherein at least one property of at least one fluid of at least one sector is controlled depending on the geometry of the welding path and/or depending on the geometry of the workpiece.

8. The method according to claim 1, wherein at least one flow parameter and/or at least one property of at least one fluid of at least one sector is controlled depending on the welding process.

9. A carrier gas nozzle for allowing at least one fluid to flow over a welding area of a workpiece along a welding path during a welding process, the carrier gas nozzle (1) comprising:

a housing, at least one inlet for the at least one fluid and a plurality of channels having openings through which the at least one fluid flows onto the welding area, wherein the channels with the openings are divided into at least two sectors, with at least one inlet for at least one fluid, which sectors are designed for the individual control of at least one flow parameter of the at least one fluid of each sector, wherein the at least two sectors are arranged depending on the geometry of the welding path and/or the geometry of the workpiece, wherein in each sector its own valves or its own flow controllers for the at least one fluid are provided, and wherein a control is provided with which the control of the at least one flow parameter of the at least one fluid of each sector can be carried out by the sector-by-sector control by means of the valves or the flow controllers, so that at least one flow parameter of at least one fluid of at least one sector can be controlled depending on the geometry of the welding path and/or depending on the geometry of the workpiece.

10. The carrier gas nozzle according to claim 9, wherein the sectors are constructed in the form of interconnectable modules.

11. The carrier gas nozzle according to claim 9, wherein at least one temperature sensor is provided for measuring at least one temperature of the welding area of the workpiece.

12. The carrier gas nozzle according to claim 9, wherein the housing, the at least one inlet for each fluid, the channels with the openings, and at most the at least one cooling fluid line are produced in one piece and preferably in a 3D printing process.

13. The carrier gas nozzle according to claim 9, wherein the channels have a round or regularly polygonal cross-section.

* * * * *